(12) United States Patent
Lee et al.

(10) Patent No.: US 11,274,205 B2
(45) Date of Patent: Mar. 15, 2022

(54) POLYAMIDE RESIN COMPOSITION AND ARTICLE COMPRISING THE SAME

(71) Applicant: Lotte Advanced Materials Co., Ltd., Yeosu-si (KR)

(72) Inventors: Sang Hwa Lee, Uiwang-si (KR); Yeong Deuk Seo, Uiwang-si (KR); Sang Hyun Hong, Uiwang-si (KR)

(73) Assignee: Lotte Advanced Materials Co., Ltd., Yeosu (KR)

( * ) Notice: Subject to any disclaimer, the term of this patent is extended or adjusted under 35 U.S.C. 154(b) by 169 days.

(21) Appl. No.: 16/687,926

(22) Filed: Nov. 19, 2019

(65) Prior Publication Data
US 2020/0165449 A1    May 28, 2020

(30) Foreign Application Priority Data
Nov. 26, 2018  (KR) .................. 10-2018-0147559

(51) Int. Cl.
| | | |
|---|---|---|
| *C08L 77/06* | (2006.01) | |
| *B29C 48/00* | (2019.01) | |
| *C08L 33/08* | (2006.01) | |
| *C08L 77/10* | (2006.01) | |
| *B29K 77/00* | (2006.01) | |
| *C08K 3/40* | (2006.01) | |

(52) U.S. Cl.
CPC ............ *C08L 77/06* (2013.01); *B29C 48/022* (2019.02); *C08L 33/08* (2013.01); *C08L 77/10* (2013.01); *B29K 2077/10* (2013.01); *C08K 3/40* (2013.01)

(58) Field of Classification Search
CPC .................... C08L 33/00–08; C08L 77/00–12
See application file for complete search history.

(56) References Cited

U.S. PATENT DOCUMENTS

| 5,306,754 A | 4/1994 | Yamamoto et al. |
| 2013/0338260 A1 | 12/2013 | Center et al. |
| 2020/0087458 A1 | 3/2020 | Ieda et al. |

FOREIGN PATENT DOCUMENTS

| JP | 2015-519465 A | 7/2015 |
| KR | 10-0113797 A | 10/1993 |
| WO | 2018/181995 A1 | 10/2018 |

OTHER PUBLICATIONS

Office Action in counterpart Korean Application No. 10-2018-0147559 dated Feb. 2, 2021, pp. 1-8.
Extended Search Report in counterpart European Application No. 19210120.2 dated Apr. 23, 2020, pp. 1-7.

*Primary Examiner* — Ana L. Woodward
(74) *Attorney, Agent, or Firm* — Additon, Pendleton & Witherspoon, P.A.

(57) ABSTRACT

A polyamide resin composition includes an aromatic polyamide resin, an aliphatic polyamide resin, a polyacrylic acid, and glass fibers. The polyamide resin composition can have good properties in terms of heat resistance, long-term heat resistance stability, and/or appearance characteristics.

11 Claims, No Drawings

POLYAMIDE RESIN COMPOSITION AND ARTICLE COMPRISING THE SAME

CROSS-REFERENCE TO RELATED APPLICATION

This application claims priority under 35 USC Section 119 to and the benefit of Korean Patent Application No. 10-2018-0147559, filed on Nov. 26, 2018, the entire disclosure of which is incorporated herein by reference.

FIELD

The present invention relates to a polyamide resin composition and a molded article including the same.

BACKGROUND

Polyamide resins are used in a wide range of fields such as electric components, electronic components, and automotive components due to good properties thereof in terms of heat resistance, abrasion resistance, chemical resistance and flame retardancy. Particularly, in the automobile industry, metal components have been replaced by plastic components to achieve weight reduction. In particular, peripheral components of an engine compartment (i.e., under-the-hood components) are exposed to a high temperature environment for a long period of time and are produced using polyamide resin compositions having good heat resistance.

Typically, organic antioxidants such as phenol or phosphite antioxidants are widely used in order to secure high heat resistance stability of a polyamide resin composition. However, there is a limitation in improvement of retaining good properties at high temperature over a long period of time (long-term heat resistance stability). Copper halide heat stabilizers, such as a CuI/KI mixture, which is known to provide good long-term heat resistance stability at high temperature as compared with organic antioxidants, have been used. However, copper is likely to discolor or precipitate over time, thereby causing problems when used in electrical, electronic, and automotive components.

Therefore, there is a need for a polyamide resin composition which has good properties in terms of heat resistance, long-term heat resistance stability, mechanical properties, and/or appearance characteristics.

SUMMARY OF THE INVENTION

The present disclosure relates to a polyamide resin composition that can have good properties in terms of heat resistance and long-term heat resistance stability, and a molded article formed of the same.

The polyamide resin composition includes: an aromatic polyamide resin; an aliphatic polyamide resin; a polyacrylic acid; and glass fibers.

The polyamide resin composition may include: about 100 parts by weight of the aromatic polyamide; about 5 parts by weight to about 30 parts by weight of the aliphatic polyamide resin; about 0.05 parts by weight to about 10 parts by weight of the polyacrylic acid; and about 50 parts by weight to about 90 parts by weight of the glass fibers.

The aromatic polyamide resin may include two or more of a repeat unit represented by Formula 1, a repeat unit represented by Formula 2, and/or a repeat unit represented by Formula 3:

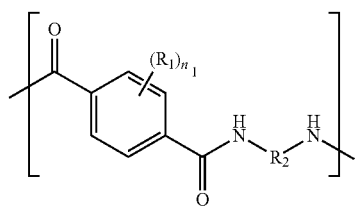

[Formula 1]

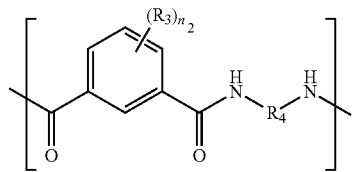

[Formula 2]

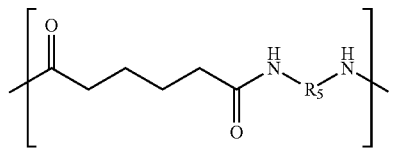

[Formula 3]

wherein $R_1$ and $R_3$ are each independently a $C_1$ to $C_6$ hydrocarbon group or a halogen atom, $R_2$, $R_4$ and $R_5$ are each independently a $C_4$ to $C_{12}$ linear or branched alkylene group, and $n_1$ and $n_2$ are each independently an integer of 0 to 4.

The aromatic polyamide resin may include about 10 mol % to about 90 mol % of the repeat unit represented by Formula 1 and about 10 mol % to about 90 mol % of the repeat unit represented by Formula 2.

The aromatic polyamide resin may include about 10 mol % to about 90 mol % of the repeat unit represented by Formula 1 and about 10 mol % to about 90 mol % of the repeat unit represented by Formula 3.

The aromatic polyamide resin may include about 20 mol % to about 50 mol % of the repeat unit represented by Formula 1, about 10 mol % to about 50 mol % of the repeat unit represented by Formula 2, and about 10 mol % to about 50 mol % of the repeat unit represented by Formula 3.

The aliphatic polyamide resin may include polyamide 6, polyamide 11, polyamide 12, polyamide 4,6, polyamide 6,6, polyamide 6,10, polyamide 6,12, polyamide 10,10, and/or polyamide 10,12.

The polyacrylic acid may have a weight average molecular weight of about 50,000 g/mol to about 300,000 g/mol, as measured by gel permeation chromatography (GPC).

The aliphatic polyamide resin and the polyacrylic acid be may present in a weight ratio of about 1:0.001 to about 1:2.

The polyacrylic acid and the glass fibers may be present in a weight ratio of about 1:10 to about 1:1,000.

The polyamide resin composition may have a heat deflection temperature (HDT) of about 280° C. or higher, as measured at a heating rate of 120° C./hr under a load of 18.56 kgf/cm² in accordance with ASTM D648.

The polyamide resin composition may have a tensile strength retention rate of about 85% or more, as calculated according to Equation 1:

Tensile strength retention rate (%)=$(TS_1/TS_0) \times 100$  [Equation 1]

where $TS_0$ denotes an initial tensile strength of a 3.2 mm thick specimen, as measured in accordance with ASTM D638 and $TS_1$ denotes a tensile strength of the specimen, as measured in accordance with ASTM D638 after the specimen is left in an oven at 250° C. or 280° C. for 1,000 hours.

The present disclosure also relates to a molded article. The molded article is formed of the polyamide resin composition as described herein.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A polyamide resin composition according to the present disclosure includes: (A) an aromatic polyamide resin; (B) an aliphatic polyamide resin; (C) a polyacrylic acid; and (D) glass fibers.

As used herein to represent a specific numerical range, the expression "a to b" means "≥a and ≤b".

(A) Aromatic Polyamide Resin

The aromatic polyamide resin according to the present disclosure can serve to improve heat resistance, rigidity, and/or impact resistance of the polyamide resin composition.

The aromatic polyamide resin may include two or more of a repeat unit represented by Formula 1, a repeat unit represented by Formula 2 and/or a repeat unit represented by Formula 3:

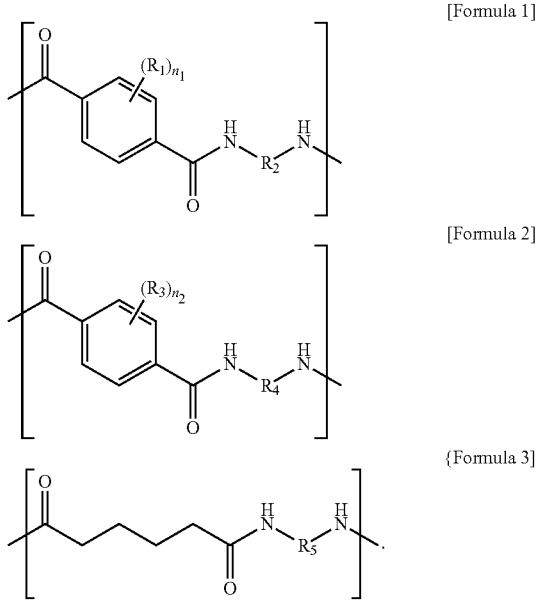

[Formula 1]

[Formula 2]

[Formula 3]

In Formulas 1, 2, and 3, $R_1$ and $R_3$ are each independently a $C_1$ to $C_6$ hydrocarbon group or a halogen atom; $R_2$, $R_4$ and $R_5$ are each independently a $C_4$ to $C_{12}$ linear or branched alkylene group; and $n_1$ and $n_2$ are each independently an integer of 0 to 4.

As used herein, the term $C_1$ to $C_6$ hydrocarbon group refers to a $C_1$ to $C_6$ alkyl group, a $C_2$ to $C_6$ alkenyl group, a $C_2$ to $C_6$ alkynyl group, and/or a $C_3$ to $C_6$ cycloalkyl group.

In exemplary embodiments, the aromatic polyamide resin can include a repeat unit represented by Formula 1 and a repeat unit represented by Formula 2.

In some embodiments, the aromatic polyamide resin may include about 10 mol % to about 90 mol %, for example, about 20 mol % to about 80 mol %, of the repeat unit represented by Formula 1 and about 10 mol % to about 90 mol %, for example, about 20 mol % to about 80 mol %, of the repeat unit represented by Formula 2.

In some embodiments, the aromatic polyamide resin can include the repeat unit represented by Formula 1 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol % based on 100 mol % of the aromatic polyamide resin. Further, according to some embodiments, the repeat unit represented by Formula 1 can be present in an amount of from about any of the foregoing amounts to about any other of the foregoing amounts.

In some embodiments, the aromatic polyamide resin can include the repeat unit represented by Formula 2 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol % based on 100 mol % of the aromatic polyamide resin. Further, according to some embodiments, the repeat unit represented by Formula 2 can be present in an amount of from about any of the foregoing amounts to about any other of the foregoing amounts.

In some embodiments, the aromatic polyamide resin may include about 10 mol % to about 90 mol %, for example, about 20 mol % to about 80 mol %, of the repeat unit represented by Formula 1 and about 10 mol % to about 90 mol %, for example, about 20 mol % to about 80 mol %, of the repeat unit represented by Formula 3.

In some embodiments, the aromatic polyamide resin can include the repeat unit represented by Formula 1 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol % based on 100 mol % of the aromatic polyamide resin. Further, according to some embodiments, the repeat unit represented by Formula 1 can be present in an amount of from about any of the foregoing amounts to about any other of the foregoing amounts.

In some embodiments, the aromatic polyamide resin can include the repeat unit represented by Formula 3 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol % based on 100 mol % of the aromatic polyamide resin. Further, according to some embodiments, the repeat unit represented by Formula 3 can be present in an amount of from about any of the foregoing amounts to about any other of the foregoing amounts.

In some embodiments, the aromatic polyamide resin may include about 20 mol % to about 50 mol %, for example, about 30 mol % to about 40 mol %, of the repeat unit represented by Formula 1, about 10 mol % to about 50 mol %, for example, about 20 mol % to about 40 mol %, of the repeat unit represented by Formula 2, and about 10 mol % to about 50 mol %, for example, about 20 mol % to about 40 mol %, of the repeat unit represented by Formula 3.

In some embodiments, the aromatic polyamide resin can include the repeat unit represented by Formula 1 in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol % based on 100 mol % of the aromatic polyamide resin. Further, according to some embodiments, the repeat unit represented by Formula 1 can be present in an amount of from about any of the foregoing amounts to about any other of the foregoing amounts.

In some embodiments, the aromatic polyamide resin can include the repeat unit represented by Formula 2 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol % based on 100 mol % of the aromatic polyamide resin. Further, according to some embodiments, the repeat unit represented by Formula 2 can be present in an amount of from about any of the foregoing amounts to about any other of the foregoing amounts.

In some embodiments, the aromatic polyamide resin can include the repeat unit represented by Formula 3 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol % based on 100 mol % of the aromatic polyamide resin. Further, according to some embodiments, the repeat unit represented by Formula 3 can be present in an amount of from about any of the foregoing amounts to about any other of the foregoing amounts.

Within these ranges, the polyamide resin composition can have good properties in terms of heat resistance, rigidity, and/or impact resistance.

Here, the aromatic polyamide resin may be prepared by reacting an aromatic dicarboxylic acid including an $R_1$-substituted or unsubstituted terephthalic acid and/or an alkyl ester thereof and/or $R_3$-substituted or unsubstituted isophthalic acid and/or an alkyl ester thereof and optionally including adipic acid with a $C_4$ to $C_{12}$ linear or branched alkylene group-containing aliphatic diamine (for example, 1,6-hexanediamine (hexamethylenediamine (HMDA)), 1,7-heptanediamine, 1,8-octanediamine, 1,9-nonanediamine, 1,10-decanediamine, 1,11-undecanediamine, and/or 1,12-dodecanediamine) by a known polymerization method.

The aromatic polyamide resin may have a glass transition temperature of about 100° C. to about 150° C., for example, about 120° C. to about 140° C., as measured by differential scanning calorimetry (DSC). Within this range, the polyamide resin composition can have good properties in terms of heat resistance, rigidity, and/or impact resistance.

In addition, the aromatic polyamide resin may have an intrinsic viscosity [η] of about 0.7 dL/g to about 1.2 dL/g, for example, about 0.8 dL/g to about 1.0 dL/g, as measured using an Ubbelohde viscometer at 25° C. after dissolving the aromatic polyamide resin in a strong (98%) sulfuric acid solution to a concentration of 0.5 g/dL. Within this range, the polyamide resin composition can have good properties in terms of heat resistance, rigidity, and/or impact resistance.

(B) Aliphatic Polyamide Resin

The aliphatic polyamide resin according to the present disclosure can serve to improve impact resistance and/or processability of the polyamide resin composition together with the aromatic polyamide resin, and may be any typical aliphatic polyamide resin known in the art.

Examples of the aliphatic polyamide resin may include without limitation polyamide 6, polyamide 11, polyamide 12, polyamide 46, polyamide 66, and polyamide 6,10, polyamide 6,12, polyamide 10,10, and/or polyamide 10,12, and the like, and combinations and/or mixtures thereof.

The aliphatic polyamide resin may have a relative viscosity [$\eta_{rel}$] of about 2 to about 3, for example, about 2.3 to about 2.8, as measured using an Ubbelohde viscometer at 25° C. after dissolving the aliphatic polyamide resin in a strong (96%) sulfuric acid solution to a concentration of 0.5 g/dL. Within this range, the polyamide resin composition can have good properties in terms of heat resistance, processability, and/or impact resistance.

The aliphatic polyamide resin may be present in an amount of about 5 parts by weight to about 30 parts by weight, for example, about 6 parts by weight to about 20 parts by weight, relative to about 100 parts by weight of the aromatic polyamide resin. In some embodiments, the polyamide resin composition can include the aliphatic polyamide resin in an amount of about 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the aromatic polyamide resin. Further, according to some embodiments, the aliphatic polyamide resin can be present in an amount of from about any of the foregoing amounts to about any other of the foregoing amounts.

Within this range, the polyamide resin composition can have good properties in terms of heat resistance, processability, and/or impact resistance.

(C) Polyacrylic Acid

The polyacrylic acid according to the present disclosure can serve to improve long-term heat resistance stability and/or appearance characteristics of the polyamide resin composition together with the aliphatic polyamide resin and the like, and may be a polyacrylic acid used in typical thermoplastic resin compositions. Polyacrylic acids are known in the art and are commercially available.

The polyacrylic acid may have a weight average molecular weight of about 50,000 g/mol to about 300,000 g/mol, for example, about 100,000 g/mol to about 200,000 g/mol, as measured by gel permeation chromatography (GPC). Within this range, the polyamide resin composition can have good properties in terms of long-term heat resistance stability and/or appearance characteristics.

The polyacrylic acid may be present in an amount of about 0.05 parts by weight to about 10 parts by weight, for example, about 0.07 parts by weight to about 7 parts by weight, relative to about 100 parts by weight of the aromatic polyamide resin. In some embodiments, the polyamide resin composition can include the polyacrylic acid in an amount of about 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight, based on about 100 parts by weight of the aromatic polyamide resin. Further, according to some embodiments, the polyacrylic acid can be present in an amount of from about any of the foregoing amounts to about any other of the foregoing amounts.

Within this range, the polyamide resin composition can have good properties in terms of long-term heat resistance stability and/or appearance characteristics.

The aliphatic polyamide resin and the polyacrylic acid may be present a weight ratio of about 1:0.001 to about 1:2, for example, about 1:0.01 to about 1:1. In some embodiments, the aliphatic polyamide resin and the polyacrylic acid may be present a weight ratio of about 1:0.001, 1:0.002, 1:0.003, 1:0.004, 1:0.005, 1:0.006, 1:0.007, 1:0.008, 1:0.009, 1:0.01, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.6, 1:0.7, 1:0.8, 1:0.9, 1:1, or 1:2. Within this range, the polyamide resin composition can have good properties in terms of heat resistance, long-term heat resistance stability, processability, and/or appearance characteristics.

(D) Glass Fibers

The glass fibers according to the present disclosure can serve to improve rigidity, impact resistance, and/or heat resistance of the polyamide resin composition, and may be glass fibers used in typical thermoplastic resin compositions.

The glass fibers may have various shapes, such as fibrous, particulate, rod, needle, flake, and/or amorphous shapes, and may have various cross-sectional shapes, such as circular, elliptical, and/or rectangular cross-sectional shapes. For example, it can be desirable in terms of mechanical properties that the glass fibers have circular and/or rectangular cross-sections.

The glass fibers having a circular cross-section may have a cross-sectional diameter of about 5 μm to about 20 μm and a pre-processing length of about 2 mm to about 20 mm, and the glass fibers having a rectangular cross-section may have a cross-sectional aspect ratio of about 1.5 to about 10 and a pre-processing length of 2 mm to about 20 mm. Within these ranges, the polyamide resin composition can have improved properties in terms of rigidity and/or processability.

The glass fibers may be present in an amount of about 50 parts by weight to about 90 parts by weight, for example, about 55 parts by weight to about 80 parts by weight, relative to about 100 parts by weight of the aromatic polyamide resin. In some embodiments, the polyamide resin composition can include the glass fibers in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight, relative to about 100 parts by weight of the aromatic polyamide resin. Further, according to some embodiments, the glass fibers can be present in an amount of from about any of the foregoing amounts to about any other of the foregoing amounts.

Within this range, the polyamide resin composition can have good properties in terms of rigidity, impact resistance, and/or heat resistance.

The polyacrylic acid and the glass fibers may be present in a weight ratio of about 1:10 to about 1:1,000, for example, about 1:10 to about 1:800. Within this range, the polyamide resin composition can have good properties in terms of rigidity, long-term heat resistance stability, appearance characteristics, impact resistance, and/or heat resistance.

The polyamide resin composition may further optionally include one or more typical additive(s) known in the art, as needed, without altering the effects of the present invention. Examples of the additive may include a flame retardant, an antioxidant, a lubricant, a release agent, a nucleating agent, an antistatic agent, and/or a colorant, and the like, and mixtures thereof, without being limited thereto. In the polyamide resin composition, the additive may be present in an amount of about 0.001 parts by weight to about 40 parts by weight, for example, 0.1 parts by weight to 20 parts by weight, relative to about 100 parts by weight of the aromatic polyamide resin.

The polyamide resin composition may be prepared in pellet form by mixing the aforementioned components, followed by melt-extrusion in a typical twin-screw extruder at about 270° C. to about 320° C., for example, about 280° C. to about 310° C.

The polyamide resin composition may have a heat deflection temperature (HDT) of about 280° C. or higher, for example, about 280° C. to about 300° C., as measured at a heating rate of 120° C./hr under a load of 18.56 kgf/cm² in accordance with ASTM D648.

The polyamide resin composition may have a tensile strength retention rate of about 85% or more, for example, about 90% to about 99%, as calculated according to Equation 1:

Tensile strength retention rate (%)=$(TS_1/TS_0) \times 100$     [Equation 1]

wherein $TS_0$ denotes an initial tensile strength of a 3.2 mm thick specimen, as measured in accordance with ASTM D638 and $TS_1$ denotes a tensile strength of the specimen, as measured in accordance with ASTM D638 after the specimen is left in an oven at 250° C. or 280° C. for 1,000 hours.

The polyamide resin composition may have a notched Izod impact strength of about 9 kgf·cm/cm or higher, for example, about 9 kgf·cm/cm to about 15 kgf·cm/cm, as measured on an about ⅛" thick specimen in accordance with ASTM D256.

A molded article according to the present disclosure is formed of the polyamide resin composition set forth above. For example, the molded article may be manufactured using the polyamide resin composition by a known molding method, such as injection molding, double injection molding, blowing, extrusion, and thermoforming. The molded article may be easily formed by those skilled in the art to which the present invention pertains.

The molded article may be used in various fields to which highly heat-resistant nylon is applied. In addition, since the molded article has good properties in terms of heat resistance, rigidity, hydrolysis resistance, moisture resistance, processability and balance therebetween and is usable for a long period of time at a high temperature of 130° C. or higher, the molded article can be particularly useful as a material for an under-the-hood (UTH) component of an automobile engine compartment, which requires such physical properties.

Next, the present invention will be described in more detail with reference to the following examples. It should be understood that these examples are provided for illustration only and are not to be in any way construed as limiting the present invention.

EXAMPLES

Details of components used in Examples and Comparative Examples are as follows:

(A) Aromatic polyamide resin (A-1) Polyamide 6T/66 (manufacturer: Solvay Co., Ltd., product name: A6000, intrinsic viscosity [η]: 0.89 dL/g)

(A-2) polyamide 6T/6I (manufacturer: Solvay Co., Ltd., product name: A6000, intrinsic viscosity [η]: 0.88 dL/g)

(A-3) Polyamide 6T/6I/66 (manufacturer: Solvay Co., Ltd., product name: A6000, intrinsic viscosity [η]: 0.85 dL/g)

(B) Aliphatic polyamide resin

Polyamide 6 (manufacturer: KP Chemtech, product name: EN-300, relative viscosity [$\eta_{rel}$]:2.5)

(C) Polyacrylic acid

Polyacrylic acid (weight average molecular weight: 130,000 g/mol)

(D) Glass fibers

Glass fibers (manufacturer: Nippon Electric Glass, product name: T-251H)

(E) Poly(methyl methacrylate)

Poly(methyl methacrylate) (PMMA, weight average molecular weight: 20,000 g/mol)

(F) Heat stabilizer

CuI/KI mixture (manufacturer: Brueggemann Chemical, product name: TP-H9008)

Examples 1 to 7 and Comparative Examples 1 to 4

The aforementioned components are mixed in amounts as listed in Tables 1 and 2. Then, the mixture is subjected to melt-extrusion in a twin-screw extruder (L/D: 40, Φ: 45 mm) at a barrel temperature of 300° C., thereby preparing a polyamide resin composition in pellet form. The prepared pellets are dried at 100° C. for 6 to 8 hours and then are subjected to injection molding using an injection machine under conditions of a cylinder temperature of 320° C. and a mold temperature of 80° C., thereby preparing a specimen. The prepared specimen is evaluated as to the following properties. Results are shown in Tables 1 and 2.

Property Evaluation (1) Heat deflection temperature (HDT, unit: ° C.): Heat deflection temperature (HDT) is measured at a heating rate of 120° C./hr under a load of 18.56 kgf/cm² in accordance with ASTM D648.

(2) Tensile strength retention rate (unit: %): Tensile strength retention rate is calculated according to Equation 1:

Tensile strength retention rate (%)=($TS_1/TS_0$)×100  [Equation 1]

where $TS_0$ denotes an initial tensile strength of a 3.2 mm thick specimen, as measured in accordance with ASTM D638, and $TS_1$ denotes a tensile strength of the specimen, as measured in accordance with ASTM D638 after the specimen is left in an oven at 250° C. or 280° C. for 1,000 hours.

(3) Notched Izod impact strength (unit: kgf·cm/cm): Notched Izod impact strength is measured on a ⅛" thick Izod specimen in accordance with ASTM D256.

(4) Blistering: A 3.2 mm thick tensile specimen is left in an oven at 250° C. or 280° C. for 1,000 hours, followed by visually checking whether blisters occur on an external surface of the specimen (Occurrence: ○, No occurrence: x).

TABLE 1

| | Examples | | | | | | |
|---|---|---|---|---|---|---|---|
| | 1 | 2 | 3 | 4 | 5 | 6 | 7 |
| (A-1) (parts by weight) | 100 | 100 | 100 | 100 | 100 | — | — |
| (A-2) (parts by weight) | — | — | — | — | — | 100 | — |
| (A-3) (parts by weight) | — | — | — | — | — | — | 100 |
| (B) (parts by weight) | 6.6 | 7 | 8.3 | 10 | 19 | 8.3 | 8.3 |
| (C) (parts by weight) | 1.64 | 0.09 | 5 | 0.18 | 1.55 | 5 | 5 |
| (D) (parts by weight) | 57.4 | 68 | 58.3 | 71 | 75 | 58.3 | 58.3 |
| (E) (parts by weight) | — | — | — | — | — | — | 5 |
| (F) (parts by weight) | — | — | — | — | — | — | — |
| Heat deflection temperature (° C.) | 284 | 285 | 285 | 284 | 282 | 280 | 281 |
| Tensile strength retention rate (%) 250° C. | 97 | 96 | 98 | 97 | 98 | 96 | 97 |
| Tensile strength retention rate (%) 280° C. | 95 | 93 | 96 | 94 | 96 | 92 | 93 |
| Notched Izod impact strength (kgf · cm/cm) | 10.5 | 9.2 | 11 | 9.6 | 10.2 | 9.5 | 9.6 |
| Blistering | x | x | x | x | x | x | x |

TABLE 2

| | Comparative Examples | | | |
|---|---|---|---|---|
| | 1 | 2 | 3 | 4 |
| (A-1) (parts by weight) | 100 | 100 | 100 | 100 |
| (B) (parts by weight) | 8.3 | 8.3 | 8.3 | — |
| (C) (parts by weight) | — | — | — | 5 |
| (D) (parts by weight) | 58.3 | 58.3 | 58.3 | 58.3 |
| (E) (parts by weight) | — | 5 | — | — |
| (F) (parts by weight) | — | — | 5 | — |
| Heat deflection temperature (° C.) | 285 | 281 | 281 | 284 |
| Tensile strength retention rate (%) 250° C. | 52 | 62 | 72 | 69 |
| Tensile strength retention rate (%) 280° C. | 32 | 25 | 34 | 45 |
| Notched Izod impact strength (kgf · cm/cm) | 9.1 | 6.5 | 8.7 | 10.5 |
| Blistering | ○ | ○ | ○ | ○ |

From the results shown in Tables 1 and 2, it can be seen that the polyamide resin compositions according to the present disclosure (Examples 1 to 7) have good properties in terms of heat resistance (heat deflection temperature), long-term heat resistance stability (tensile strength retention rate and blistering), impact resistance (notched Izod impact strength), and appearance characteristics (blistering).

Conversely, the polyamide resin composition of Comparative Example 1, which does not include the polyacrylic acid, has poor properties in terms of long-term heat resistance stability and appearance characteristics; the polyamide resin composition of Comparative Example 2 prepared using poly(methyl methacrylate) instead of the polyacrylic acid has poor properties in terms of tensile strength retention rate and impact strength and suffers from blistering; the polyamide resin composition of Comparative Example 3 prepared using a heat stabilizer (CuI/KI mixture) instead of the polyacrylic acid has poor properties in terms of tensile strength retention rate and suffers from blistering; and the polyamide resin composition of Comparative Example 4, which does not include the aliphatic polyamide resin, has poor properties in terms of tensile strength retention rate and suffers from blistering.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A polyamide resin composition comprising:
about 100 parts by weight of an aromatic polyamide resin;
about 5 parts by weight to about 30 parts by weight of an aliphatic polyamide resin;
about 0.05 parts by weight to about 10 parts by weight of a polyacrylic acid; and
about 50 parts by weight to about 90 parts by weight of glass fibers,
wherein the polyacrylic acid has a weight average molecular weight of about 50,000 g/mol to about 300,000 g/mol, as measured by gel permeation chromatography (GPC).

2. The polyamide resin composition according to claim 1, wherein the aromatic polyamide resin comprises two or more repeat units selected from the group consisting of a repeat unit represented by Formula 1, a repeat unit represented by Formula 2, and a repeat unit represented by Formula 3:

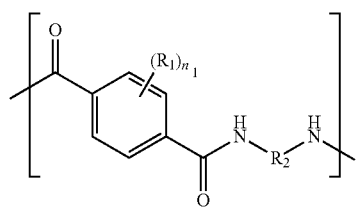

[Formula 1]

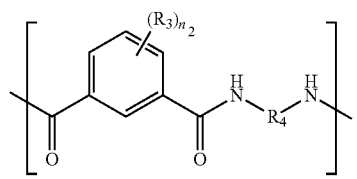

[Formula 2]

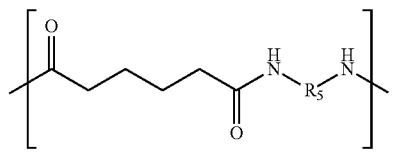

[Formula 3]

wherein $R_1$ and $R_3$ are each independently a $C_1$ to $C_6$ hydrocarbon group or a halogen atom, $R_2$, $R_4$ and $R_5$ are each independently a $C_4$ to $C_{12}$ linear or branched alkylene group, and $n_1$ and $n_2$ are each independently an integer of 0 to 4.

3. The polyamide resin composition according to claim 2, wherein the aromatic polyamide resin comprises about 10 mol % to about 90 mol % of the repeat unit represented by Formula 1 and about 10 mol % to about 90 mol % of the repeat unit represented by Formula 2.

4. The polyamide resin composition according to claim 2, wherein the aromatic polyamide resin comprises about 10 mol % to about 90 mol % of the repeat unit represented by Formula 1 and about 10 mol % to about 90 mol % of the repeat unit represented by Formula 3.

5. The polyamide resin composition according to claim 2, wherein the aromatic polyamide resin comprises about 20 mol % to about 50 mol % of the repeat unit represented by Formula 1, about 10 mol % to about 50 mol % of the repeat unit represented by Formula 2, and about 10 mol % to about 50 mol % of the repeat unit represented by Formula 3.

6. The polyamide resin composition according to claim 1, wherein the aliphatic polyamide resin comprises polyamide 6, polyamide 11, polyamide 12, polyamide 4,6, polyamide 6,6, polyamide 6,10, polyamide 6,12, polyamide 10,10, and/or polyamide 10,12.

7. The polyamide resin composition according to claim 1, wherein the aliphatic polyamide resin and the polyacrylic acid are present in a weight ratio of about 1:0.002 to about 1:2.

8. The polyamide resin composition according to claim 1, wherein the polyacrylic acid and the glass fibers are present in a weight ratio of about 1:10 to about 1:1,000.

9. The polyamide resin composition according to claim 1, wherein the polyamide resin composition has a heat deflection temperature (HDT) of about 280° C. or higher, as measured at a heating rate of 120° C./hr under a load of 18.56 kgf/cm² in accordance with ASTM D648.

10. The polyamide resin composition according to claim 1, wherein the polyamide resin composition has a tensile strength retention rate of about 85% or more, as calculated according to Equation 1:

$$\text{Tensile strength retention rate (\%)} = (TS_1/TS_0) \times 100 \quad \text{[Equation 1]}$$

wherein $TS_0$ denotes an initial tensile strength of a 3.2 mm thick specimen, as measured in accordance with ASTM D638 and $TS_1$ denotes a tensile strength of the specimen, as measured in accordance with ASTM D638 after the specimen is left in an oven at 250° C. or 280° C. for 1,000 hours.

11. A molded article formed of the polyamide resin composition according to claim 1.

* * * * *